US012639923B2

(12) United States Patent (10) Patent No.: US 12,639,923 B2
Xu et al. (45) Date of Patent: May 26, 2026

(54) PICTURE PROCESSING METHOD, ELECTRONIC DEVICE AND COMPUTER READABLE MEDIUM

(71) Applicant: BOE Technology Group Co., Ltd., Beijing (CN)

(72) Inventors: Zhi Xu, Beijing (CN); Mingming Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 447 days.

(21) Appl. No.: 18/281,781

(22) PCT Filed: Jan. 3, 2023

(86) PCT No.: PCT/CN2023/070037
§ 371 (c)(1),
(2) Date: Sep. 13, 2023

(87) PCT Pub. No.: WO2023/138353
PCT Pub. Date: Jul. 27, 2023

(65) Prior Publication Data
US 2024/0153242 A1 May 9, 2024

(30) Foreign Application Priority Data
Jan. 21, 2022 (CN) .......................... 202210076199.0

(51) Int. Cl.
*G06K 9/00* (2022.01)
*G06V 10/764* (2022.01)
(52) U.S. Cl.
CPC ........ *G06V 10/764* (2022.01); *G06V 2201/07* (2022.01)
(58) Field of Classification Search
CPC ...... G06V 10/764; G06V 20/20; G06V 10/40; G06V 10/95; G06V 10/82; G06V 20/63;
(Continued)

(56) References Cited

U.S. PATENT DOCUMENTS

| | | | |
|---|---|---|---|
| 2010/0021070 A1 | 1/2010 | Lo | |
| 2012/0239652 A1* | 9/2012 | Wood ...................... | H04L 69/22 707/E17.089 |

(Continued)

FOREIGN PATENT DOCUMENTS

| | | |
|---|---|---|
| CN | 101635763 A | 1/2010 |
| CN | 102622392 A | 8/2012 |

(Continued)

OTHER PUBLICATIONS

Office Action dated Mar. 14, 2025 for CN202210076199.0 and English Translation.
Office Action dated Aug. 22, 2025 for CN 202210076199.0 and English Translation.
International Search Report for PCT/CN2023/070037 Mailed Mar. 14, 2023.

*Primary Examiner* — Alex Kok S Liew
(74) *Attorney, Agent, or Firm* — Ling Wu; Stephen Yang; Ling and Yang Intellectual Property

(57) ABSTRACT

Provided in the present disclosure is a picture processing method, comprising: acquiring picture information of a picture, to be classified, of a first terminal, and according to the picture information, classifying said picture into at least one picture category of the first terminal; in response to satisfying a preset synchronization condition, acquiring a synchronous storage position of a second terminal, and determining the category of at least one picture, to be synchronized, of the first terminal; and for the category of each picture to be synchronized, determining a storage space, corresponding to the picture category, in the synchronous storage position, and transmitting the picture, of the first terminal, under the picture category to the storage space. Further provided in the present disclosure are an electronic device and a computer readable medium.

14 Claims, 6 Drawing Sheets

(58) Field of Classification Search
CPC ...... G06V 10/774; G06V 10/80; G06V 10/87;
G06V 10/955; G06V 20/10; G06V 20/40;
G06V 10/25; G06V 20/00; G06V 20/52;
G06V 20/597; G06V 2201/10; G06V
40/172; G06V 40/174; G06V 20/50;
G06V 20/70; G06V 10/771; G06V
10/7753; G06V 10/811; G06V 10/94;
G06V 20/46; G06V 2201/06; G06V
2201/09; G06F 18/24; G06F 18/214;
G06F 18/25; G06F 18/285; G06F
2218/12; G06F 16/587; G06F 16/54;
G06F 16/55; G06F 16/5866; G06F
18/2155; G06F 16/29; G06F 16/583;
G06F 16/248; G06N 20/00; G06N
3/0464; G06N 3/09; G06N 3/045; G06N
3/08; G06N 3/02; G06N 3/082; G06N
5/01; G06N 5/04; G06N 20/20; G06N
3/044; G06N 3/0455; G06N 3/0475;
G06N 5/00; G06N 5/022; G06N 7/01
See application file for complete search history.

(56)                References Cited

U.S. PATENT DOCUMENTS

2013/0227564 A1*   8/2013   Asayama ............. G06F 16/176
                                                                718/1
2018/0234588 A1*   8/2018   Chen ........................ H04L 51/52
2022/0335673 A1*  10/2022   Jang ........................ G06T 11/00

FOREIGN PATENT DOCUMENTS

| CN | 104077312 | A | 10/2014 |
| CN | 105373557 | A | 3/2016 |
| CN | 105824862 | A | 8/2016 |
| CN | 107977431 | A | 5/2018 |
| CN | 105608189 | B | 10/2019 |
| CN | 112416883 | A | 2/2021 |
| CN | 112835978 | A | 5/2021 |
| CN | 114416647 | A | 4/2022 |
| WO | 2018219178 | A1 | 12/2018 |
| WO | 2021190165 | A1 | 9/2021 |

* cited by examiner

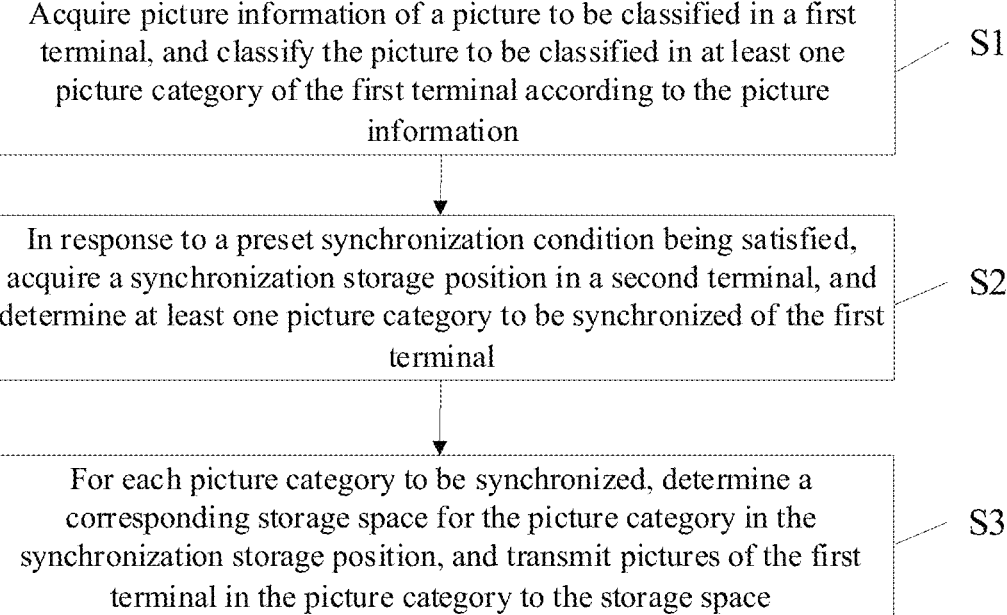

Acquire picture information of a picture to be classified in a first terminal, and classify the picture to be classified in at least one picture category of the first terminal according to the picture information — S1

In response to a preset synchronization condition being satisfied, acquire a synchronization storage position in a second terminal, and determine at least one picture category to be synchronized of the first terminal — S2

For each picture category to be synchronized, determine a corresponding storage space for the picture category in the synchronization storage position, and transmit pictures of the first terminal in the picture category to the storage space — S3

FIG. 1

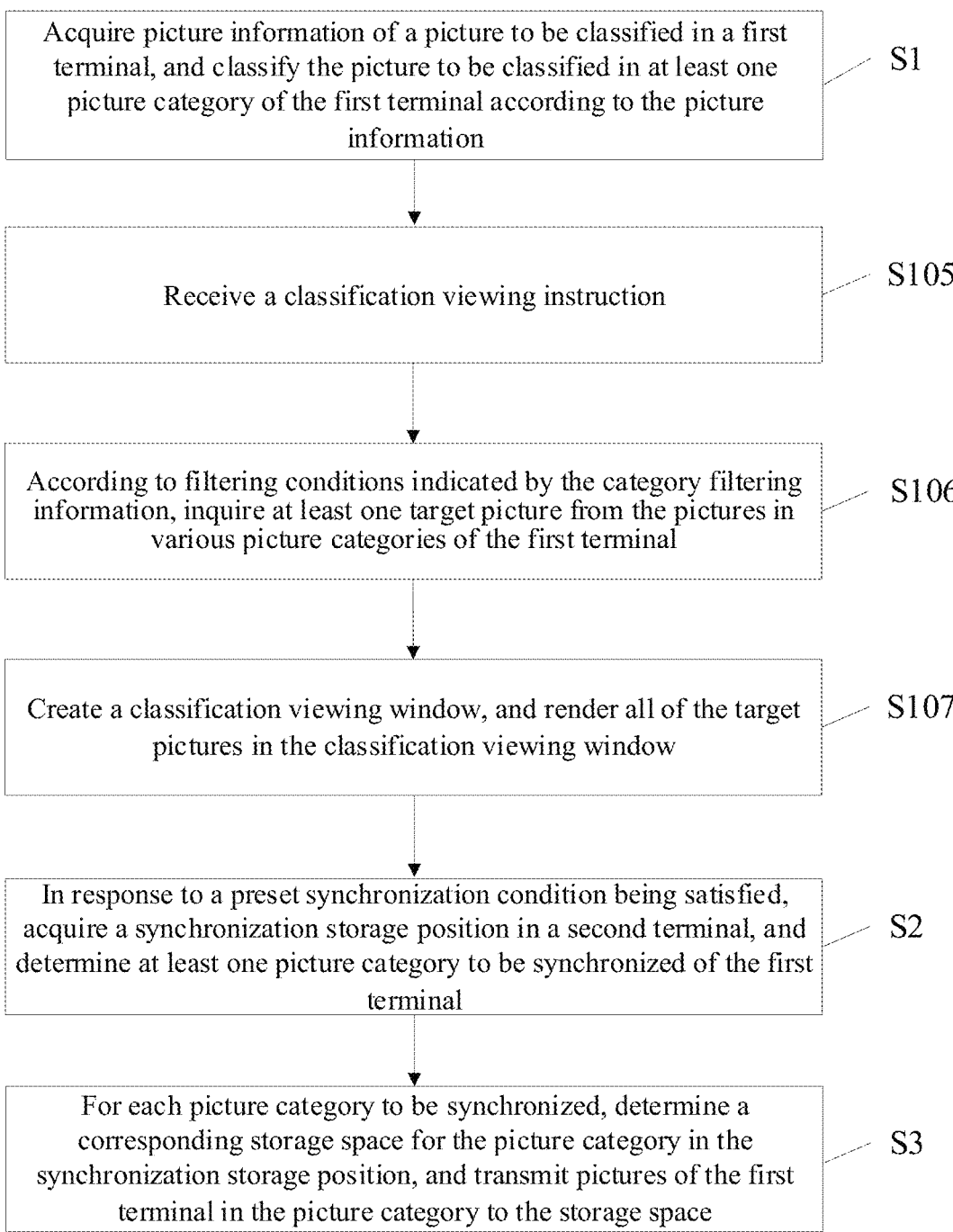

Acquire picture information of a picture to be classified in a first terminal, and classify the picture to be classified in at least one picture category of the first terminal according to the picture information — S1

Receive a classification viewing instruction — S105

According to filtering conditions indicated by the category filtering information, inquire at least one target picture from the pictures in various picture categories of the first terminal — S106

Create a classification viewing window, and render all of the target pictures in the classification viewing window — S107

In response to a preset synchronization condition being satisfied, acquire a synchronization storage position in a second terminal, and determine at least one picture category to be synchronized of the first terminal — S2

For each picture category to be synchronized, determine a corresponding storage space for the picture category in the synchronization storage position, and transmit pictures of the first terminal in the picture category to the storage space — S3

Non-transitory
computer-readable
storage medium

PICTURE PROCESSING METHOD, ELECTRONIC DEVICE AND COMPUTER READABLE MEDIUM

CROSS-REFERENCE TO RELATED APPLICATIONS

The present application is a U.S. National Phase Entry of International Application PCT/CN2023/070037 having an international filing date of Jan. 3, 2023, which claims priority to Chinese Patent Application No. 202210076199.0 filed on Jan. 21, 2022. The above-identified applications are incorporated by reference herein in their entireties.

TECHNICAL FIELD

The present disclosure relates to the technical field of computers, in particular to a picture processing method, an electronic device and a computer readable medium.

BACKGROUND

With development of computer technologies and picture processing technologies, most user terminals can be used to shoot, transmit and store pictures, such as a mobile phone photo album function of a mobile phone. At present, user terminals have a low flexibility of an image storage function and are difficult to synchronize images with other terminals.

SUMMARY

The present disclosure aims at solving at least one of the technical problems existing in the prior art, and provides a picture processing method, an electronic device and a computer readable medium.

To achieve the above objectives, in a first aspect, a picture processing method is provided in an embodiment of the present disclosure, the method includes:

acquiring picture information of a picture to be classified in a first terminal, and classifying the picture to be classified into at least one picture category of the first terminal according to the picture information;

in response to a preset synchronization condition being satisfied, acquiring a synchronization storage position of a second terminal, and determining at least one picture category to be synchronized of the first terminal; and for each picture category to be synchronized, determining a corresponding storage space for the picture category in the synchronization storage position, and transmitting a picture of the picture category in the first terminal to the storage space.

In some embodiments, the picture information includes a target element in the picture to be classified, a geographic location property of the picture to be classified, and a time property of the picture to be classified;

the picture category includes a first category corresponding to the target element, a second category corresponding to the geographic location property, and a third category corresponding to the time property;

acquiring picture information of the picture to be classified in the first terminal, and classifying the picture to be classified into at least one picture category of the first terminal according to the picture information, includes:

performing at least one of the following acts: identifying a target element in the picture to be classified, determining the first picture category of the picture to be classified according to the target element; determining the second category of the picture to be classified according to the geographic location property of the picture to be classified; and determining the third category of the picture to be classified according to the time property of the picture to be classified; and classifying the picture to be classified into determined at least one of the picture categories.

In some embodiments, after acquiring picture information of the picture to be classified in the first terminal, and classifying the picture to be classified into at least one picture category of the first terminal according to the picture information, the method further includes:

receiving a classification viewing instruction including category filtering information for indicating at least one of the picture categories of the first terminal as a filtering condition;

according to filtering conditions indicated by the category filtering information, inquiring at least one target picture from the pictures in each picture category of the first terminal; and creating a classification viewing window, and rendering at least part of the target pictures in the classification viewing window.

In some embodiments, after determining a corresponding storage space for the picture category in the synchronization storage position for each picture category to be synchronized, and transmitting pictures of the picture category in the first terminal to the storage space, the method further includes:

receiving a second classification viewing instruction including category filtering information for indicating at least one of the picture categories as a filtering condition;

filtering each of storage spaces in the synchronization storage position of the second terminal according to the filtering condition indicated by the category filtering information, and inquiring at least one target picture from the filtered storage space; and creating a classification view window and rendering at least part of the target picture in the category view window.

In some embodiments, after acquiring picture information of the picture to be classified in the first terminal, and classifying the picture to be classified into at least one picture category of the first terminal according to the picture information, the method further includes:

sorting and generating a new picture category according to at least part of the picture category to which the picture to be classified belongs in response to a category sorting instruction; and classifying the picture to be classified into the new picture category.

In some embodiments, the preset synchronization conditions include at least one of the following:

a preset time period elapsed between a current moment and a moment when a last picture synchronization was carried out;

a picture synchronization instruction sent by the first terminal or the second terminal is received; and a user interaction event for triggering detected by the first terminal or the second terminal.

In some embodiments, the second terminal is a cloud platform server, and the synchronization storage position is a cloud platform storage path;

determining a corresponding storage space for the picture category in the synchronization storage position for each picture category to be synchronized, and transmitting pictures of the picture category in the first terminal to the storage space, includes:

for each picture category to be synchronized, determining a corresponding folder in a cloud platform storage path for the picture category, and uploading pictures of the picture category in the first terminal to the folder through an application programming interface.

In some embodiments, before determining a corresponding folder in a cloud platform storage path for the picture category for each picture category to be synchronized, and uploading pictures of the picture category in the first terminal to the folder through an application programming interface, the method further includes:

according to a directory structure corresponding to all the picture categories to be synchronized in the first terminal, establishing a directory structure in the cloud platform storage path through the application program interface and creating a folder.

In some embodiments, the second terminal is a computer device and the synchronization storage position is a computer storage path;

determining a corresponding storage space for the picture category in the synchronization storage position for each picture category to be synchronized, and transmitting pictures of the picture category in the first terminal to the storage space, includes:

determining the corresponding folder in the computer storage path for each picture category to be synchronized, and transmitting pictures of the picture category in the first terminal to the folder by a preset protocol.

In some embodiments, before determining the corresponding folder in the computer storage path for each picture category to be synchronized, and transmitting pictures of the picture category in the first terminal to the folder by a preset protocol, the method further includes:

according to a directory structure corresponding to all the picture categories to be synchronized in the first terminal, establishing a directory structure in the computer storage path and creating a folder.

In some embodiments, the computer storage path belongs to an internal memory of the computer device;

the preset protocol includes at least one of a wireless network broadcast protocol, a socket-based communication protocol, and a file transfer protocol.

In some embodiments, the computer storage path belongs to an external memory of the computer device;

determining the corresponding folder in the computer storage path for each picture category to be synchronized, and transmitting pictures of the picture category in the first terminal to the folder by a preset protocol, includes:

determining a corresponding folder in a storage path in the external memory for each picture category to be synchronized, and copying pictures of the picture category in the first terminal to the folder by an interface protocol corresponding to the external memory.

In a second aspect, an electronic device is also provided in the present disclosure, and the electronic device includes:

one or more processors;

a memory for storing one or more programs;

when the one or more programs are executed by the one or more processors, the one or more processors implement the picture processing method in any one of the above embodiments.

In a third aspect, a computer readable medium having a computer program stored thereon is also provided in an embodiment of the present disclosure, wherein the acts of the picture processing method in any one of the above embodiments are implemented when the computer program is executed.

BRIEF DESCRIPTION OF DRAWINGS

The accompanying drawings are used for providing further understanding of the present disclosure, constitute a part of the specification, and are used for explaining the present disclosure together with the embodiments of the present disclosure, but do not constitute limitations on the present disclosure. The above and other features and advantages will become more apparent to those skilled in the art by describing detailed exemplary embodiments with reference to the accompanying drawings, in which:

FIG. 1 is a flowchart of a method for processing an picture according to an embodiment of the present disclosure;

FIG. 3 is a flowchart of another picture processing method according to an embodiment of the present disclosure;

DETAILED DESCRIPTION

Figure 2:
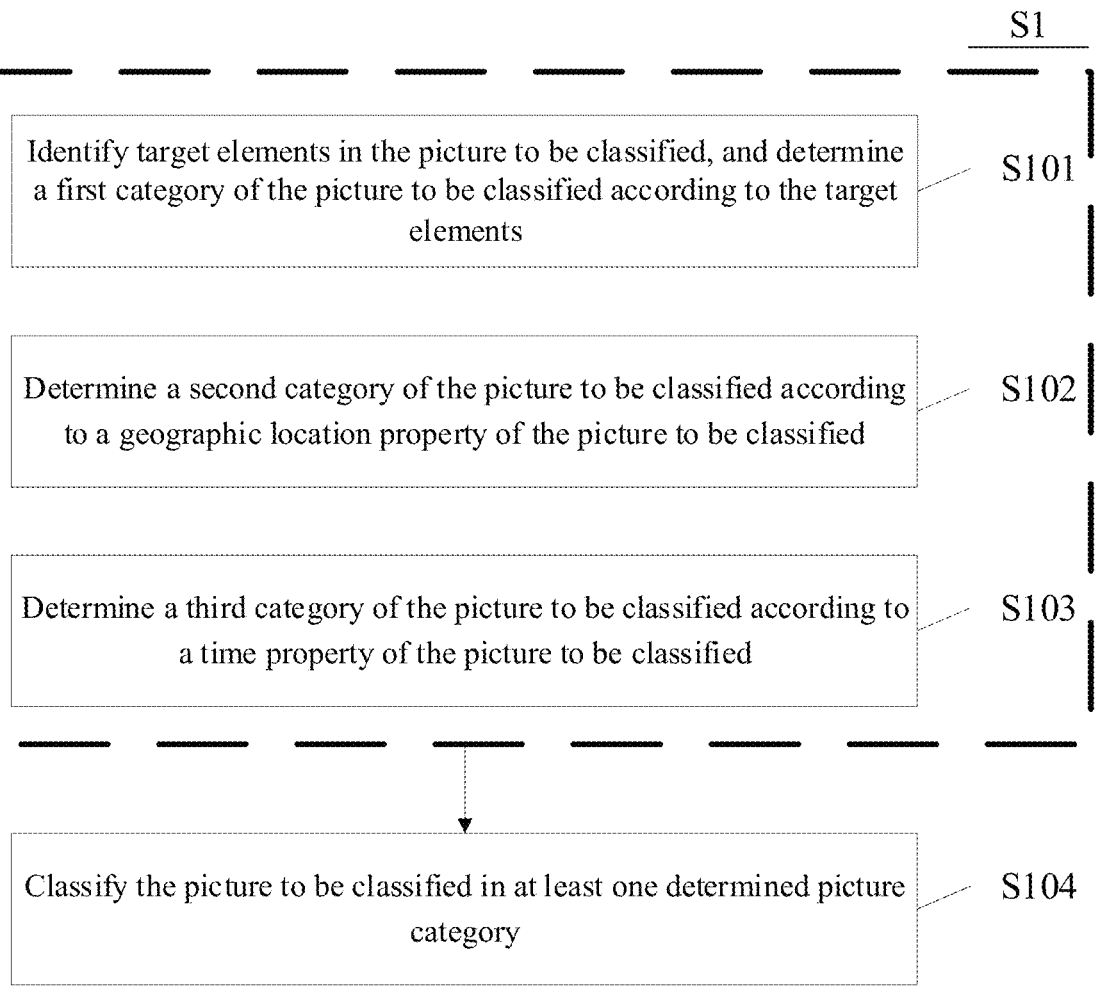
FIG. 2 is a flowchart of a specific implementation of an act S1 according to an embodiment of the present disclosure.

In order to enable those skilled in the art to better understand the technical scheme of the present disclosure, a picture processing method, an electronic device and a computer readable medium provided in the present disclosure will be described in detail below with reference to the accompanying drawings.

Exemplary embodiments will be described more fully hereinafter with reference to the accompany drawings, but the exemplary embodiments may be embodied in different forms and should not be construed as limited to the embodiments set forth herein. On the contrary, these examples are provided for the purpose of making the present disclosure thorough and complete, and will enable those skilled in the art to fully understand the scope of the present disclosure.

Terms used herein are only used to describe specific embodiments and are not intended to limit the present disclosure. As used herein, the singular forms "a" and "the" are also intended to include the plural forms, unless the context clearly indicates otherwise. It will be also understood that as used in this specification, the terms "including" and "made of" specify the presence of stated features, integers, acts, operations, elements and/or components, but do not exclude the presence or addition of one or more other features, integers, acts, operations, elements, components and/or groups thereof.

It will be understood that while the terms first, second and the like may be used herein to describe various elements, these elements should not be subject to these terms. These terms are used only to distinguish one component from another. Thus a first element, a first component or a first module discussed below may be referred to as a second element, a second component or a second module without departing from teachings of the present disclosure.

Unless otherwise limitations, all terms used herein including technical and scientific terms have a same meaning as normally be understood by those ordinary skilled in the art. It will also be understood that terms such as those defined in commonly used dictionaries should be construed as having meanings consistent with their meanings in a context in a related art and the present disclosure, and will not be construed as having idealized or over-formal meanings unless expressly so defined herein.

FIG. 1 is a flowchart of a method for processing an picture according to an embodiment of the present disclosure. As shown in FIG. 1, the method includes acts S1 to S3.

In act S1, picture information of a picture to be classified in a first terminal is acquired, and the picture to be classified is classified into at least one picture category of the first terminal according to the picture information.

The picture to be classified can be a specific picture selected by a user among pictures stored in the first terminal. The picture to be classified can also be a newly added picture to the first terminal, such as a picture captured by an image capture apparatus (camera, etc.) of the first terminal, a picture received or downloaded by the first terminal through a specific transmission approach, etc. In some embodiments, the first terminal may be a mobile terminal, a personal computer or other interoperable electronics.

The picture information is used to describe various properties of the picture and to carry additional data, other than image data, of the picture. In some embodiments the picture information may include a target element in the picture, a geographic location property of the picture, a time property of the picture and the like. In some embodiments, the picture information may further include a picture format, a picture resolution, a gray scale distribution of the picture, a color distribution of the picture, and the like.

In act S2, in response to a preset synchronization condition being satisfied, a synchronization storage position in a second terminal is acquired, and at least one picture category to be synchronized of the first terminal is determined.

Picture synchronization can be carried out between the first terminal and the second terminal, and a synchronization storage position in the second terminal can be a file export root directory corresponding to a picture of a picture category to be synchronized by the first terminal. In some embodiments, the second terminal may be a server, a mobile terminal, a personal computer, or the like.

In some embodiments, the preset synchronization condition includes at least one of the following: a preset time period elapsed between a current moment and a moment when a last picture synchronization was carried out; a picture synchronization instruction sent by the first terminal or the second terminal being received; and a user interaction event for triggering detected by the first terminal or the second terminal. Corresponding to the preset synchronization condition, a picture synchronization mode between the first terminal and the second terminal includes: periodically performing the picture synchronization; picture synchronization initiated by either of the first terminal and the second terminal; and picture synchronization triggered based on the user interaction event, wherein the user interaction event may include pressing and clicking specific buttons or areas, specific touch behaviors, and specific expressions, body movements and the like collected by a graphics capture device.

In act S3, for each picture category to be synchronized, a corresponding storage space for the picture category in the synchronization storage position is determined, and pictures of the picture category in the first terminal are transmitted to the storage space.

For each picture category to be synchronized, a picture of the picture category in the first terminal is transmitted to an independent storage space in the second terminal. Correspondingly, storage spaces, in the synchronization storage position in the second terminal, corresponding to respective picture categories are different from each other, thereby picture classification export and synchronization are achieved.

A picture processing method is provided in an embodiment of the present disclosure, which includes: classifying a picture to be classified in a first terminal; carrying out picture classification and exporting between the first terminal and a second terminal based on a picture category in the first terminal. Therefore, a fast classification of the picture at the first terminal and exporting the picture from one terminal according to the picture category are achieved, so that a classification structure of the picture can be known by another terminal that synchronizes the picture, improving synchronization and avoiding repeated classification of the same picture at different terminals.

FIG. 2 is a flowchart of a specific implementation of the act S1 according to an embodiment of the present disclosure. Specifically, the picture information includes at least one of a target element in the picture to be classified, a geographic location property of the picture to be classified, and a time property of the picture to be classified. The picture category includes a first category corresponding to the target element, a second category corresponding to the geographic location property, and a third category corresponding to the time property. As shown in FIG. 2, in act S1, the act of acquiring picture information of the picture to be classified of a first terminal and classifying the picture to be classified into at least one picture category of the first terminal according to the picture information includes:

performing at least one of act S101, act S102 and act S103.

In act S101, target elements in the picture to be classified are identified, and a first category of the picture to be classified is determined according to the target elements.

The target element is an image element which can be identified based on a corresponding target recognition algorithm, and it is obtained based on the image data of the picture to be classified. The target element can include portraits, food, natural scenery, animals, texts, etc. The first category can also be named according to a class name of above-mentioned target element. In some embodiments, the picture to be classified includes a plurality of target elements which may correspond to a plurality of first categories, correspondingly. In some embodiments, the target element can not only be identified in real time based on the corresponding target recognition algorithm, but also can serve as additional data in a form of special fields or identifiers, so that the target element in the picture to be classified can also be known by direct reading.

In act S102, a second picture category of the picture to be classified is determined according to a geographic location property of the picture to be classified.

In act S103, a third picture category of the picture to be classified is determined according to a time property of the picture to be classified.

The geographic location property and the time property are additional data. For example, when the picture to be classified is acquired by an image capture device of the first terminal, a geographic location can be obtained by the first terminal when shooting, based on a positioning module of the first terminal and a corresponding positioning algorithm, and can be attached to the picture. System time can be obtained by the first terminal and attached to the picture.

In some embodiments, the geographic location property may include information about the country, province, city, district, county and the like where the picture is shot. The geographic location property may also include information about latitude, longitude, altitude and the like. The second category may employ any one of the above classes of geographic location properties. Similar to the first category, the picture information of the picture to be classified may carry the geographic location properties in a plurality of dimensions, and then it can correspond to a plurality of second categories.

In some embodiments, the time property may include information such as year, month, day, etc. The time property may also include information such as time zone, daylight saving time or winter time currently in use, and the third category may employ any one of the above types of time properties. Similar to the first category and the second category, the picture information of the picture to be classified may carry the time properties in a plurality of dimensions, then it may correspond to a plurality of third categories.

After at least one of the acts S101, S102 and S103 is performed, an act S104 is further included.

In act S104, the picture to be classified is classified into at least one determined picture category.

The pictures to be classified can be classified into the determined picture categories for storage. In some embodiments, it can be understood that the picture to be classified has only a unique storage path in the first terminal, and the picture can correspond to a plurality of picture categories, and a user can also view the picture to be classified in various corresponding picture categories.

In some embodiments, after the act S1 of acquiring the picture information of the picture to be classified in the first terminal and classifying the picture to be classified into at least one picture category of the first terminal according to the picture information, the method further includes: sorting and generating a new picture category according to at least part of the picture categories to which the picture to be classified belongs in response to a category sorting instruction; and classifying the picture to be classified into the new picture category. An original picture category can be embodied in the new picture category in a form of picture category label, and the category sorting instruction can be used to indicate that specific picture categories to which the picture to be classified belongs are sorted. Specifically, when the picture to be classified corresponds to a plurality of picture categories, for example, when a plurality of picture categories corresponding to the picture to be classified are determined based on at least two of the acts S101 to S103, a new picture category may also be created. The created new picture category covers various determined picture categories, and the picture to be classified may belong to the newly created picture category after being classified.

FIG. 3 is a flowchart of another picture processing method according to an embodiment of the present disclosure.

Specifically, the method is a special, alternative implementation based on the method shown in FIG. 1. As shown in FIG. 3, the method includes not only the acts S1 to S3, but also acts S105 to S107 after the act S1 of acquiring the picture information of the picture to be classified in the first terminal and classifying the picture to be classified into the at least one picture category of the first terminal according to the picture information. Only the acts S105 to S107 are described in detail below.

In the act S105, a classification viewing instruction is received.

The classification viewing instruction includes category filtering information for indicating at least one picture category of the first terminal as a filtering condition.

Specifically, if the classification viewing instruction is received in a case of implementing the method shown in FIG. 2, since the first categories corresponding to each of the pictures in the first terminal may be different, the second categories may be different, and the third categories may also be different, then the picture categories in the first terminal include a plurality of first categories, second categories, and third categories, and the picture categories indicated by the category filtering information may be all the first categories, all the second categories, or all the third categories. Of course, the picture categories indicated by the category filtering information may be one or more specific first categories, or one or more specific second categories, or one or more third specific categories.

In some embodiments, a user may determine a picture category as a filtering condition through a graphical interactive interface, whereby a corresponding classification viewing instruction may be generated.

In the act S106, according to filtering conditions indicated by the category filtering information, at least one target picture is inquired from the pictures in various picture categories of the first terminal.

In the act S107, a classification viewing window is created, and at least part of the target pictures are rendered in the classification viewing window.

Pictures which completely or partially meet the filtering conditions are filtered from the pictures in various picture categories of the first terminal as the target pictures, and are presented according to the picture categories in the classification viewing window. Specifically, before rendering, a quantity of target pictures to be rendered can be determined according to a size of the classification viewing window, an overall size of the interactive interface and sizes of various target pictures. All the target pictures can be rendered, or parts of the target images are thumbnails or not displayed.

Specifically, the acts S105 to S107 correspond to picture classification viewing at the first terminal side, and in some embodiments, similarly correspond to picture classification viewing at the second terminal side. After the act S3 of determining the corresponding storage space for the picture category in the synchronization storage position for each picture category to be synchronized, and transmitting the pictures in the picture category of the first terminal to the storage space, the method further includes receiving a second classification viewing instruction including category filtering information for indicating at least one picture category as a filtering condition; filtering various storage spaces in the synchronization storage position of the second terminal according to the filtering condition indicated by the category filtering information, and inquiring at least one target picture from the filtered storage space; creating a classification view window and rendering at least part of the target pictures in the category view window. The various storage spaces in the synchronization storage position of the second terminal has a corresponding relationship with the picture categories, and a storage space storing a corresponding target picture can be filtered from various storage spaces according to the filtering condition indicated by the category filtering information.

Figure 4:
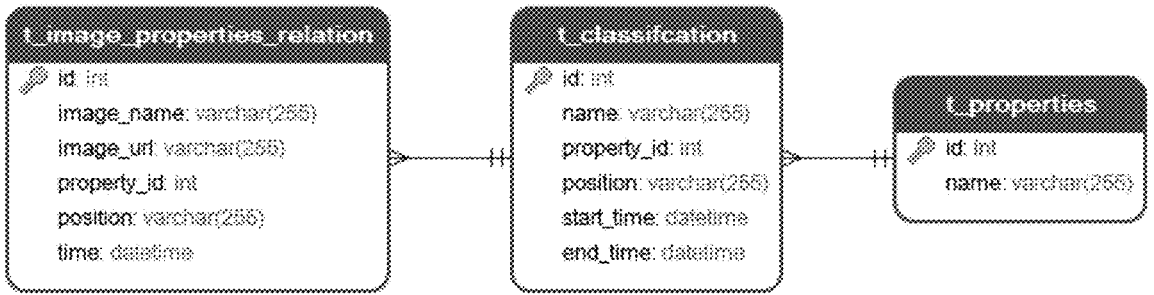
FIG. 4 is a schematic diagram of a relationship table according to an embodiment of the present disclosure.

FIG. 4 is a schematic diagram of a relationship table according to an embodiment of the present disclosure. As shown in FIG. 4, a situation that the picture information of the first terminal is saved and inquired based on a database form is shown. A database relationship table includes a classification table, a property table, and a picture property relationship table, wherein, a field corresponding to the classification table is named as "t_classifcation", a field corresponding to the property table is named as "t_proper-ties", and a field corresponding to the picture property relationship table is named as "t_image_properties_rela-tion". The classification table includes parameters, such as a primary key, a picture category name, a target element identification, a place, start time and end time, and fields corresponding to the above parameters are names as "id", "name", "property_id", "position", "start_time" and "end-_time" in order, respectively. The property table includes parameters, such as a primary key and a target element name, and fields corresponding to the above parameters are named as "id" and "name" in order, respectively. The picture property relationship table includes parameters such as a primary key, a picture name, a picture path, a first category identification, a second category and a third category, and fields corresponding to the above parameters are named as "id", "image_name", "image_url", "property_id", "posi-tion" and "time" in order, respectively. The first category identification corresponds to the target element identifica-tion in the classification table, the second category corre-sponds to the place in the classification table, and the third category corresponds to the start time and the end time in the classification table. FIG. 4 also shows data types corre-sponding to the above parameters, including integer type (int), string type (varchar) and datetime type (datetime). When performing classification viewing, a set of picture category names to be demonstrated is generated at first according to the filtering conditions indicated by the cat-egory filtering information and the target element identifi-cation, the place, the start time and the end time in the classification table. The set of picture category names is traversed, the picture property relationship table is inquired according to the target element identification, place, start time and end time, in the classification table, corresponding to various picture category names, thereby inquiring and obtaining the picture name and the picture path of the target picture. A classification viewing window is created accord-ing to various picture category names in the set of picture category names, and all target pictures are rendered in various classification viewing windows according to the picture name and picture path of the target picture.

Figure 5:
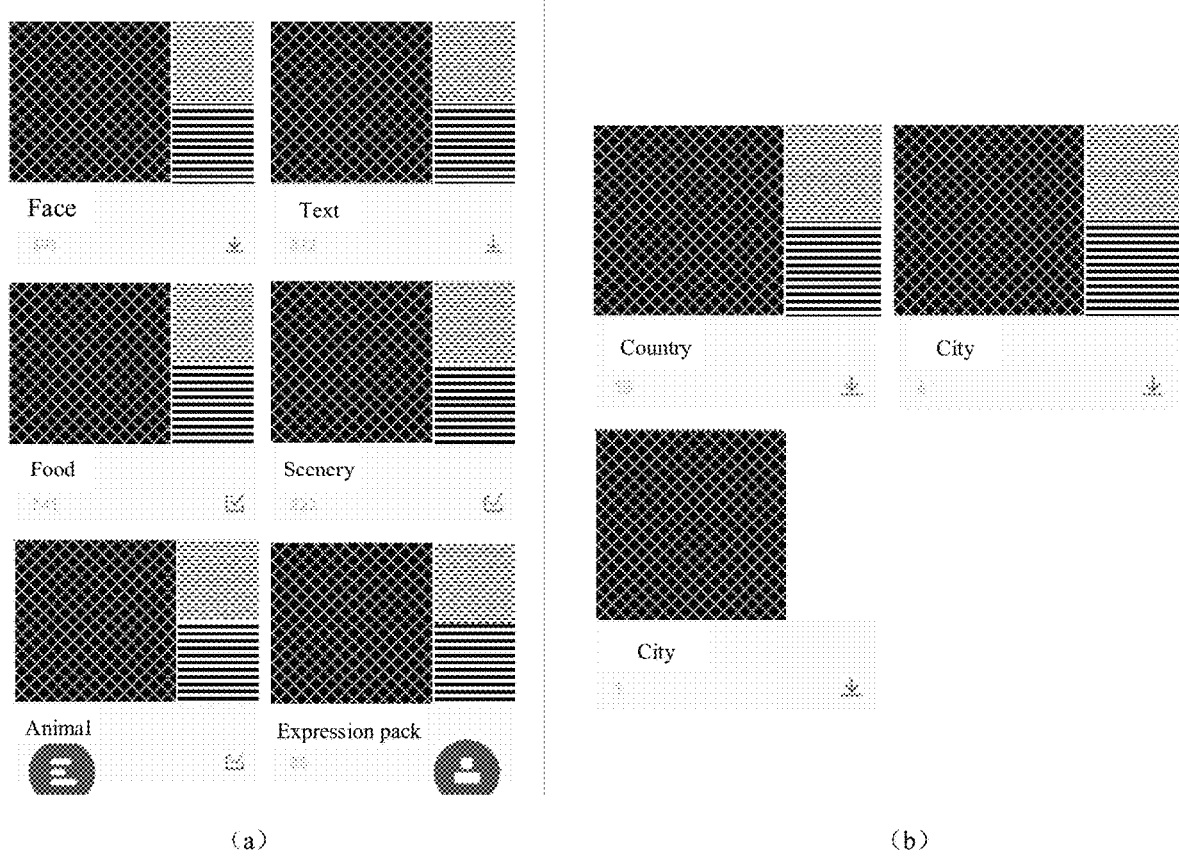
FIG. 5 is a schematic diagram of a classification viewing window according to an embodiment of the present disclosure.

FIG. 5 is a schematic diagram of a classification viewing window according to an embodiment of the present disclo-sure. As shown in FIG. 5, in (a), a situation where a filtering condition is a specific first category is shown exemplarily, wherein an interface includes six classification viewing windows which correspond to a filtering condition of face, text, food, scenery, animal and expression pack, respec-tively. A lower left corner of the classification viewing window illustrates a filtering condition of the window and a quantity of all pictures corresponding to the filtering con-dition of the window. A lower right corner of the classifi-cation viewing window illustrates a synchronization state of the pictures therein. An upper part of the classification viewing window illustrates thumbnails of the pictures therein after rendering (represented by filling patterns in the drawings), and a plurality of interaction buttons can be set below an overall interaction interface as shown in FIG. 5. In (b), a situation where the filtering condition is a specific second category is shown exemplarily, and the classification viewing window is similar in form to that in (a), and each classification viewing window corresponds to the filtering condition being a country, a city or the like.

Figure 6:
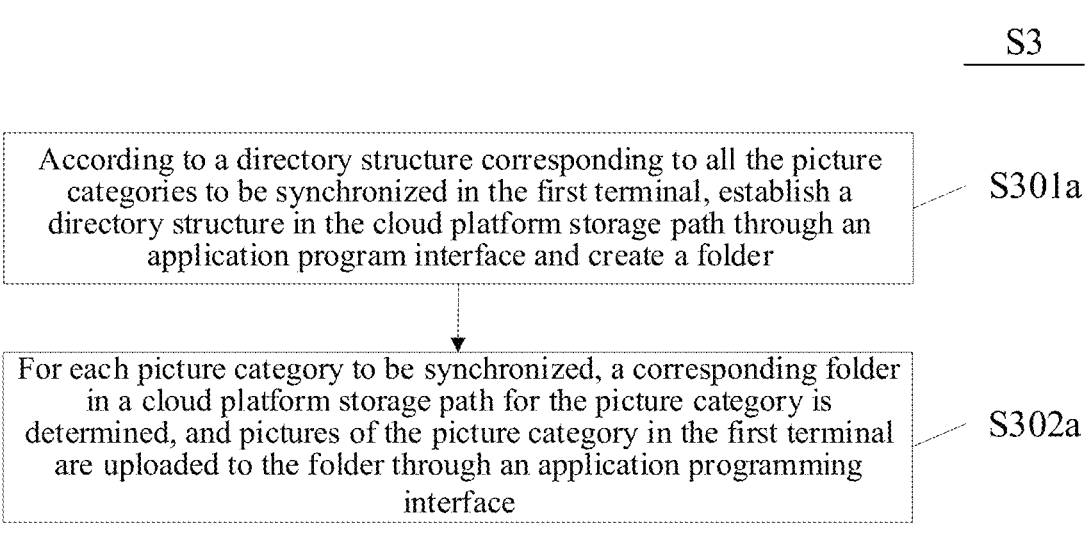
FIG. 6 is a flowchart of a specific implementation of an act S3 according to an embodiment of the present disclosure.

FIG. 6 is a flowchart of a specific implementation of the act S3 according to an embodiment of the present disclosure. Specifically, the second terminal is a cloud platform server, and the synchronization storage position is a cloud platform storage path. As shown in FIG. 6, the act S3 of determining the corresponding storage space for the picture category in the synchronization storage position for each picture cat-egory to be synchronized, and transmitting the picture of the picture category in the first terminal to the storage space, includes act S302*a*.

In the act S302*a*, for each picture category to be synchro-nized, a corresponding folder in a cloud platform storage path for the picture category is determined, and pictures of the picture category in the first terminal are uploaded to the folder through an application programming interface.

An Application Programming Interface (API) is also referred to as an application program programming inter-face. By creating corresponding applications in the cloud platform and applying for a corresponding application inter-face permission, the application programming interface can be called to synchronize pictures to the cloud platform.

In some embodiments, as shown in FIG. 5, before the act S302*a* of determining the corresponding folder for the picture category in the cloud platform storage path for each picture category to be synchronized, and uploading pictures of the picture category in the first terminal to the folder through the application program interface, the method fur-ther includes act S301*a*.

In the act S301*a*, according to a directory structure corresponding to all the picture categories to be synchro-nized in the first terminal, a directory structure is established in the cloud platform storage path through an application program interface and a folder is created.

According to the directory structure of the first terminal, the same directory structure is established in the cloud platform storage path, so that more intuitive and convenient picture classification synchronization can be achieved, and a presentation mode of picture classification display can be the same at the first terminal as that at a cloud platform terminal, which can enhance the synchronization of picture display.

Figure 7:
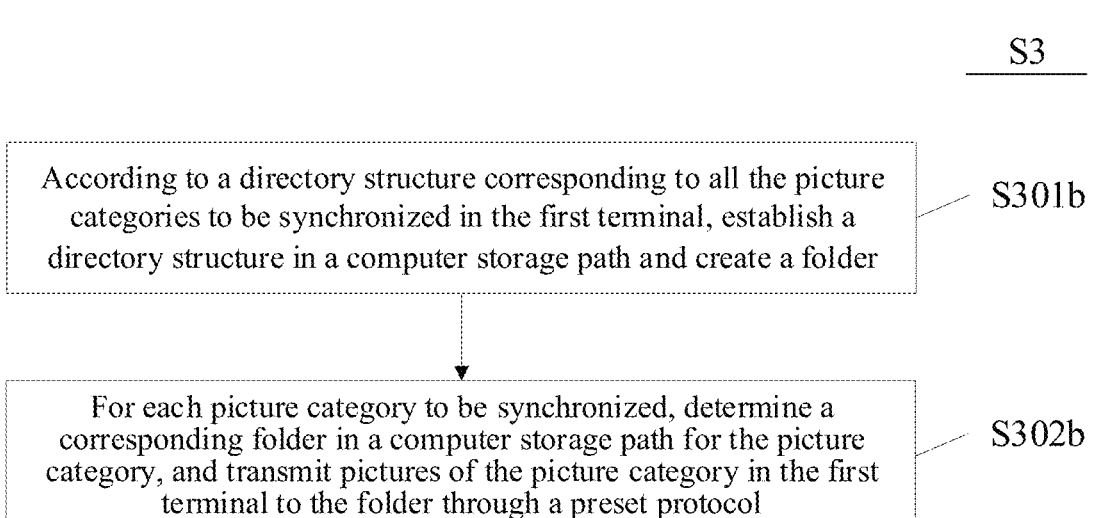
FIG. 7 is a flowchart of another specific implementation of the act S3 according to an embodiment of the present disclosure.
Figures 8, 9:
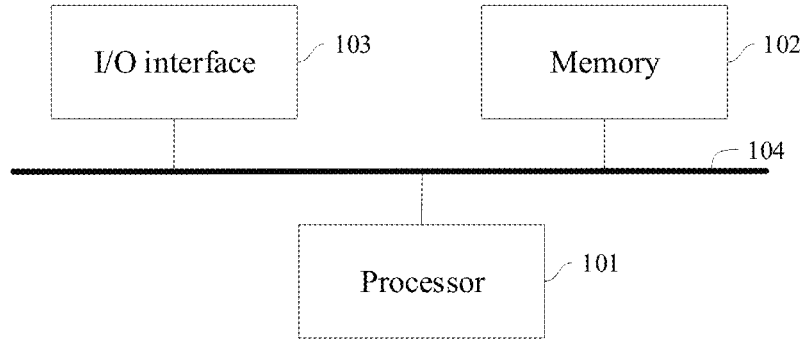
FIG. 8 is a block view of an electronic device according to an embodiment of the present disclosure.
FIG. 9 is a block diagram of a non-transitory computer-readable storage medium provided in an embodiment of the present disclosure.

FIG. 7 is a flowchart of another specific implementation of the act S3 according to an embodiment of the present disclosure. Specifically, the second terminal is a computer device, and the synchronization storage position is a com-puter storage path. As shown in FIG. 8, the act S3 of determining the corresponding storage space for the picture category in the synchronization storage position for each picture category to be synchronized, and transmitting the picture of the picture category in the first terminal to the storage space, includes act S302*b*.

In the act S302*b*, for each picture category to be synchro-nized, a corresponding folder in a computer storage path for the picture category is determined, and pictures of the picture category in the first terminal are transmitted to the folder by a preset protocol.

In some embodiments, the first terminal is a mobile terminal and the second terminal is a computer device (such as a personal computer). A connection is established based on a mobile terminal program and a computer client program. The computer client program confirms a storage path of the picture at a computer terminal, and performs operations such as directory inquiry and creation, folder inquiry and creation, and then transmits the picture by a preset protocol.

In some embodiments, the computer storage path belongs to an internal memory of the computer device. The preset protocol includes at least one of a Wifi Broadcast protocol, a Socket-based communication protocol, and a File Transfer Protocol (FTP).

Alternatively, in some embodiments, the computer storage path belongs to an external memory of the computer device. The act S302$b$ of determining the corresponding folder in the computer storage path for each picture category to be synchronized and transmitting pictures of the picture category in the first terminal to the folder by the preset protocol, includes: for each picture category to be synchronized, a corresponding folder in the storage path of the external memory for the picture category is determined, and pictures of the picture category in the first terminal are copied to the folder by an interface protocol corresponding to the external memory, wherein the external memory can be a Universal Serial Bus (USB) based storage device, etc.

In some embodiments, as shown in FIG. 7, before the act S302$b$ of determining the corresponding folder in the computer storage path for each picture category to be synchronized, and transmitting pictures of the picture category in the first terminal to the folder by a preset protocol, the method further includes act S301$b$.

In the act S301$b$, according to a directory structure corresponding to all the picture categories to be synchronized in the first terminal, a directory structure is established in the computer storage path and a folder is created.

Similar to the cloud platform terminal, according to the directory structure of the first terminal, the same directory structure is established in the computer storage path, so that more intuitive and convenient picture classification synchronization can be achieved, and a presentation mode of picture classification display can be the same at the first terminal as that at the computer terminal, which can enhance the synchronization of picture display.

The picture processing method according to an embodiment of the present disclosure will be described in detail in combination with a practical application.

Specifically, the first terminal is a mobile terminal. For the picture to be classified in the first terminal, a target element in the picture to be classified is identified, a first picture category of the picture to be classified is determined according to a target element, a second picture category of the picture to be classified is determined according to a geographic location property of the picture to be classified, a third picture category of the picture to be classified is determined according to a time property of the picture to be classified, and the picture to be classified is classified into the determined first category, the second category and the third category.

In one embodiment, the second terminal is a cloud platform server. A developer is registered in the cloud platform in advance, a cloud platform application is created, an application program interface permission corresponding to a personal cloud storage service is opened, and a mark and a key of the application program interface are recorded, then a dependent package corresponding to the mobile terminal is downloaded and integrated into the cloud platform application. After a user uses the mobile terminal to connect with the cloud platform application through the mobile terminal program and logs in to the cloud platform, an access token is obtained, and then pictures are uploaded through an opened application program interface. When synchronizing pictures, names of all picture categories to be synchronized are acquired through the mobile terminal program at first, and a corresponding directory structure in the mobile terminal is known. According to the directory structure, a directory structure is established in a cloud platform storage path through the application program interface and a folder is created. After that, for each picture category to be synchronized in the mobile terminal, a folder corresponding to a picture category in the cloud platform storage path is determined, a storage path of pictures of the picture category in the mobile terminal is determined, and the picture in the picture category is uploaded to a corresponding folder in a cloud platform terminal through the application program interface.

In another embodiment, the second terminal is a computer device. A corresponding client program is installed in the computer device, and a connection can be established between a mobile terminal program in the mobile terminal and a computer client program. When synchronizing pictures, names of all picture categories to be synchronized are acquired through the mobile terminal program at first, and a corresponding directory structure in the mobile terminal is known. According to the directory structure, a directory structure is established in a computer storage path through a computer client program and a folder is created. After that, for each picture category to be synchronized in the mobile terminal, a folder corresponding to a picture category in the computer storage path is determined, a storage path of pictures of the picture category in the mobile terminal is determined, and the picture in the picture category is transmitted to a folder in a computer terminal by a preset protocol.

FIG. 8 is a block view of an electronic device provided in an embodiment of the present disclosure. As shown in FIG. 8, the electronic device includes:

one or more processors 101;

memory 102 having one or more programs stored thereon, when the one or more programs are executed by the one or more processors, a picture processing method as in any of the above embodiments is implemented by the one or more processors 101;

one or more I/O interfaces 103 coupled between the processor and the memory and configured to enable information interaction between the processor and the memory.

The Processor 101 is a device with data processing capability, including but not limited to a Central Processing Unit (CPU) and the like. The memory 102 is a device having data storage capability, including but not limited to a Random Access Memory (RAM, more specifically a Synchronous Dynamic Random Access Memory (SDRAM), a Double Data Rate (DDR), etc.), a Read Only Memory (ROM), an Electrically Erasable Programmable Read Only Memory (EEPROM), a FLASH memory (FLASH). An Input/Output interface (I/O interface) 103 is connected between the processor 101 and the memory 102, includes but not limited to a data bus and the like, and can achieve information interaction between the processor 101 and the memory 102.

In some embodiments, the processor 101, the memory 102 and the I/O Interface 103 are connected to each other via the bus 104 and thereby to other components of a computing device.

In some embodiments, a plurality of processors 101 includes a plurality of Graphics Processing Units (GPUs) which are arranged in combination to form a graphics processor array.

FIG. 9 is a block diagram of a non-transitory computer readable storage medium provided in an embodiment of the present disclosure. A computer program is stored on the computer-readable storage medium, wherein, when executed by a processor, a picture processing method as in any of the above embodiments is implemented by the computer program.

It may be understood by those ordinary skilled in the art that all or some acts in a method and function modules/units in an apparatus disclosed above may be implemented as software, firmware, hardware, and appropriate combinations thereof. In a hardware implementation, division of the function modules/units mentioned in the above description is not always corresponding to division of physical components. For example, a physical component may have multiple functions, or a function or an act may be executed by several physical components in cooperation. Some physical components or all physical components may be implemented as software executed by a processor such as a central processing unit, a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those ordinary skilled in the art, a term computer storage medium includes transitory and non-transitory, removable and irremovable media implemented in any method or technology for storing information (for example, computer-readable instructions, a data structure, a program module, or other data). The computer storage medium includes, is but not limited to, a Random Access Memory (RAM), a Read-Only Memory (ROM), an Electrically Erasable Programmable ROM (EEPROM), a flash memory or other memory technologies, a Compact Disc Read-Only Memory (CD-ROM), a Digital Video Disk (DVD) or other optical discs, a cassette, a magnetic tape, a disk memory or other magnetic storage apparatuses, or any other medium configurable to store expected information and accessible by a computer. In addition, it is known to those ordinary skills in the art that the communication medium usually includes a computer-readable instruction, a data structure, a program module, or other data in a modulated data signal of, such as, a carrier or another transmission mechanism, and may include any information delivery medium.

Exemplary embodiments have been disclosed herein, and although specific terms are employed, they are only used and should only be interpreted in a general illustrative sense, and are not used for the purpose of limitation. In some examples, it is obvious to those skilled in the art that the features, characteristics and/or elements described in connection with specific embodiments may be used alone or in combination with those described in connection with other embodiments, unless explicitly stated otherwise. Therefore, it will be understood by those skilled in the art that various changes in form and details may be made without departing from the scope of the present disclosure as set forth in the appended claims.

The invention claimed is:

1. A picture processing method comprising:

acquiring picture information of a picture to be classified in a first terminal, and classifying the picture to be classified into at least one picture category of the first terminal according to the picture information;

in response to a preset synchronization condition being satisfied, acquiring a synchronization storage position of a second terminal, and determining at least one picture category to be synchronized of the first terminal; and for each picture category to be synchronized, determining a corresponding storage space for the picture category in the synchronization storage position, and transmitting a picture of the picture category in the first terminal to the storage space.

2. The picture processing method of claim 1, wherein the picture information comprises a target element in the picture to be classified, a geographic location property of the picture to be classified, and a time property of the picture to be classified;

the picture category comprises a first category corresponding to the target element, a second category corresponding to the geographic location property, and a third category corresponding to the time property;

acquiring picture information of the picture to be classified in the first terminal, and classifying the picture to be classified into at least one picture category of the first terminal according to the picture information, comprises:

performing at least one of the following acts: identifying the target element in the picture to be classified, determining the first picture category of the picture to be classified according to the target element; determining the second category of the picture to be classified according to the geographic location property of the picture to be classified; and determining the third category of the picture to be classified according to the time property of the picture to be classified; and classifying the picture to be classified into determined at least one of the picture categories.

3. The picture processing method of claim 1, after acquiring the picture information of the picture to be classified in the first terminal and classifying the picture to be classified into the at least one picture category of the first terminal according to the picture information, the method further comprises:

receiving a first classification viewing instruction including category filtering information for indicating at least one of the picture categories as a filtering condition;

according to the filtering condition indicated by the category filtering information, inquiring at least one target picture from the pictures in various picture categories of the first terminal; and creating a classification viewing window, and rendering at least part of the target pictures in the classification viewing window.

4. The picture processing method of claim 1, after determining a corresponding storage space for the picture category in the synchronization storage position for each picture category to be synchronized, and transmitting the picture of the picture category in the first terminal to the storage space, the method further comprises:

receiving a second classification viewing instruction including category filtering information for indicating at least one of the picture categories as a filtering condition; and filtering each of storage spaces in the synchronization storage position of the second terminal according to the filtering condition indicated by the category filtering information, and inquiring at least one target picture from the filtered storage space; and creating a classification view window and rendering at least part of the target picture in the category view window.

5. The picture processing method of claim 1, after acquiring the picture information of the picture to be classified in the first terminal and classifying the picture to be classified into the at least one picture category of the first terminal according to the picture information, the method further comprises:

sorting and generating a new picture category according to at least part of the picture categories to which the picture to be classified belongs in response to a category sorting instruction; and classifying the picture to be classified into the new picture category.

6. The picture processing method of claim 1, wherein the preset synchronization condition comprises at least one of:

a preset time period elapsed between a current moment and a moment when a last picture synchronization was carried out;

a picture synchronization instruction sent by the first terminal or the second terminal being received; and a user interaction event for triggering detected by the first terminal or the second terminal.

7. The picture processing method of claim 1, wherein the second terminal is a cloud platform server and the synchronization storage position is a cloud platform storage path;

determining the corresponding storage space for the picture category in the synchronization storage position for each picture category to be synchronized, and transmitting the picture of the picture category in the first terminal to the storage space, comprises:

for each picture category to be synchronized, determining a corresponding folder in the cloud platform storage path for the picture category, and uploading pictures of the picture category in the first terminal to the folder through an application programming interface.

8. The picture processing method of claim 7, before determining the corresponding folder in the cloud platform storage path for each picture category to be synchronized, and uploading pictures of the picture category in the first terminal to the folder through an application programming interface, the method further comprises:

according to a directory structure corresponding to all the picture categories to be synchronized in the first terminal, establishing a directory structure in the cloud platform storage path through the application program interface and creating a folder.

9. The picture processing method of claim 1, wherein the second terminal is a computer device and the synchronization storage position is a computer storage path;

determining a corresponding storage space for the picture category in the synchronization storage position for each picture category to be synchronized, and transmitting pictures of the picture category in the first terminal to the storage space, comprises:

determining a corresponding folder in the computer storage path for each picture category to be synchronized, and transmitting pictures of the picture category in the first terminal to the folder by a preset protocol.

10. The picture processing method of claim 9, before determining the corresponding folder in the computer storage path for each picture category to be synchronized, and transmitting pictures of the picture category in the first terminal to the folder through the preset protocol, the method further comprises:

according to a directory structure corresponding to all the picture categories to be synchronized in the first terminal, establishing a directory structure in the computer storage path and creating a folder.

11. The picture processing method of claim 9, wherein the computer storage path belongs to an internal memory of the computer device;

the preset protocol comprises at least one of a wireless network broadcast protocol, a socket-based communication protocol, and a file transfer protocol.

12. The picture processing method of claim 9, wherein the computer storage path belongs to an external memory of the computer device;

determining the corresponding folder in the computer storage path for each picture category to be synchronized, and transmitting pictures of the picture category in the first terminal to the folder by a preset protocol, comprises:

determining a corresponding folder in a storage path in the external memory for each picture category to be synchronized, and copying pictures of the picture category in the first terminal to the folder through an interface protocol corresponding to the external memory.

13. An electronic device comprising:

one or more processors; and a memory for storing one or more programs;

when the one or more programs are executed by the one or more processors, the one or more processors implementing the picture processing method of claim 1.

14. A non-transitory computer readable storage medium, storing a computer program, wherein acts of the picture processing method of claim 1 are implemented when the computer program is executed.

* * * * *